(12) United States Patent
Nishiwaki et al.

(10) Patent No.: US 10,456,994 B2
(45) Date of Patent: Oct. 29, 2019

(54) COMPOSITE CONTAINER

(71) Applicant: SAMTECH CORPORATION, Osaka (JP)

(72) Inventors: Hideaki Nishiwaki, Osaka (JP); Senta Tojo, Osaka (JP); Junzo Suzuki, Osaka (JP); Makoto Sanada, Osaka (JP)

(73) Assignee: SAMTECH CORPORATION, Osaka (JP)

( * ) Notice: Subject to any disclaimer, the term of this patent is extended or adjusted under 35 U.S.C. 154(b) by 123 days.

(21) Appl. No.: 15/567,362

(22) PCT Filed: Jun. 17, 2016

(86) PCT No.: PCT/JP2016/068088
§ 371 (c)(1),
(2) Date: Oct. 17, 2017

(87) PCT Pub. No.: WO2017/073108
PCT Pub. Date: May 4, 2017

(65) Prior Publication Data
US 2018/0104916 A1    Apr. 19, 2018

(30) Foreign Application Priority Data

Oct. 26, 2015 (JP) ................................. 2015-209593

(51) Int. Cl.
*F17C 1/06* (2006.01)
*F16J 12/00* (2006.01)
(Continued)

(52) U.S. Cl.
CPC ............ *B29C 70/16* (2013.01); *B29C 53/605* (2013.01); *F16J 12/00* (2013.01); *F17C 1/06* (2013.01);
(Continued)

(58) Field of Classification Search
CPC ......... B29C 70/16; B29C 70/10; B29C 70/06; B29C 53/605; B29C 53/602; B29C 53/60;
(Continued)

(56) References Cited

U.S. PATENT DOCUMENTS 3,228,549 A * 1/1966 Courtney .................. F17C 1/16
220/589
3,331,722 A * 7/1967 Ponemon .............. B29C 53/605
156/425

(Continued)

FOREIGN PATENT DOCUMENTS

JP          2010-236587 A     10/2010
WO     WO-2012161006 A1 *  11/2012 ............... F16J 12/00

OTHER PUBLICATIONS

Translation of JP2010236587, Yamauchi et al., Oct. 21, 2010, Paragraphs 27 and 28. (Year: 2010).*

(Continued)

*Primary Examiner* — Robert J Hicks
(74) *Attorney, Agent, or Firm* — McDermott Will & Emery LLP

(57) ABSTRACT

A composite container is provided where FRP layers are formed by winding FRP around a metal liner so that the dome sections are reinforced while limiting an increase in the weight. The FRP layers include a hoop layer that covers the entirety of the cylindrical section in hoop winding, and dome section reinforcing layers that also cover as least the portions of the cylindrical section near the dome sections. In the dome section reinforcing layers, FRP are wound in helical form in such a manner that the orientation angle of the FRP over the cylindrical section relative to the direction of the axis of the liner continuously changes towards the center of the cylindrical section, and thus, the weight of FRP near the center of the cylindrical section is reduced.

12 Claims, 3 Drawing Sheets

(51) Int. Cl.
  *F17C 1/16* (2006.01)
  *B29C 70/16* (2006.01)
  *B29C 53/60* (2006.01)
  *B29K 105/08* (2006.01)
(52) U.S. Cl.
  CPC .......... *F17C 1/16* (2013.01); *B29K 2105/08* (2013.01); *F17C 2201/0109* (2013.01); *F17C 2201/0128* (2013.01); *F17C 2203/0604* (2013.01); *F17C 2203/0607* (2013.01); *F17C 2203/067* (2013.01); *F17C 2203/0624* (2013.01); *F17C 2203/0646* (2013.01); *F17C 2203/0648* (2013.01); *F17C 2203/0665* (2013.01); *F17C 2209/2154* (2013.01); *F17C 2260/011* (2013.01)
(58) Field of Classification Search
  CPC ......... B29C 53/56; B29C 53/582; B65D 1/40; F16J 12/00; F17C 1/06; F17C 1/04; F17C 1/02; F17C 1/16
  USPC ......... 220/589, 588, 586, 581, 62.19, 62.11; 206/0.6; 156/173, 172, 171, 170, 169, 156/162, 190, 184
  See application file for complete search history.

(56) References Cited

U.S. PATENT DOCUMENTS 8,727,174 B2 * 5/2014 Otsubo .................. F17C 13/06
  156/188
2012/0021165 A1 * 1/2012 Hethcock ................. B32B 3/12
  428/107

OTHER PUBLICATIONS

Translation of WO2012161006, Ohashi et al., Nov. 29, 2012, Fig. 1b (Year: 2012).*
Search Report issued in corresponding International Patent Application No. PCT/JP2016/068088, dated Aug. 23, 2016.

* cited by examiner

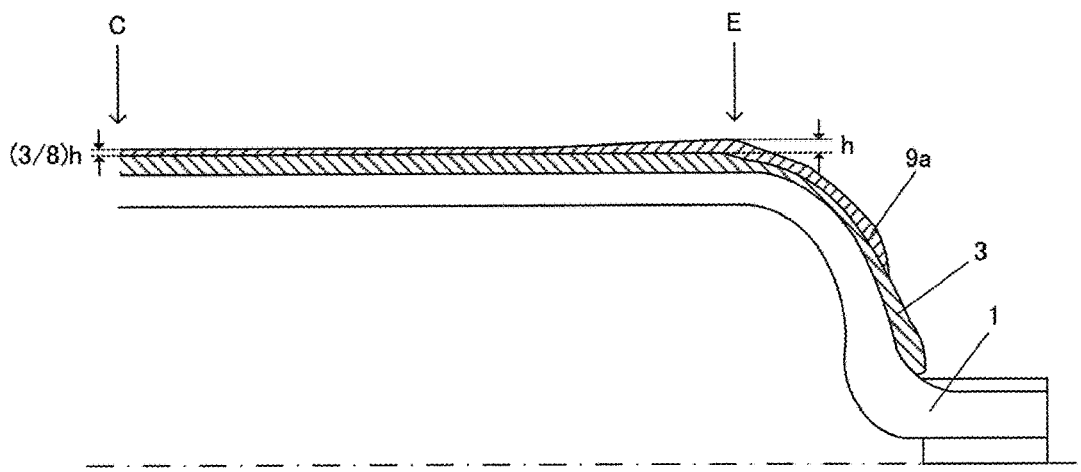

FIG. 5

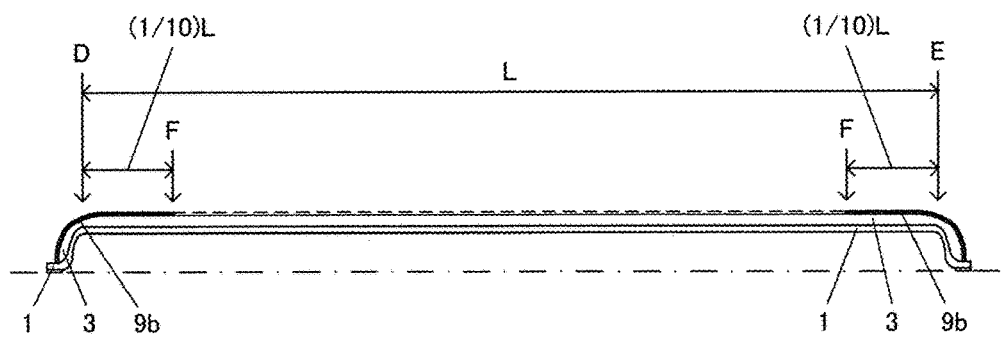

FIG. 6

| Comparison Example | | Example |
|---|---|---|
| Helical layer 3 | → | Dome section reinforcing layer 9b |
| High angle helical layer 3a | → | Dome section reinforcing layer 9a |
| Hoop layer 2 | | Hoop layer 2 |
| High angle helical layer 3a | → | Dome section reinforcing layer 9a |
| Hoop layer 2 | | Hoop layer 2 |
| Helical layer 3 | | Helical layer 3 |
| Hoop layer 2 | | Hoop layer 2 |
| High angle helical layer 3a | → | Dome section reinforcing layer 9a |
| Hoop layer 2 | | Hoop layer 2 |
| High angle helical layer 3a | → | Dome section reinforcing layer 9a |
| Hoop layer 2 | | Hoop layer 2 |
| Helical layer 3 | | Helical layer 3 |
| Hoop layer 2 | | Hoop layer 2 |
| Helical layer 3 | | Helical layer 3 |
| Liner 1 | | Liner 1 |

FIG. 7

PRIOR ART

COMPOSITE CONTAINER

CROSS REFERENCE

This application is the U.S. National Phase under 35 U.S.C. § 371 of International Application No. PCT/JP2016/068088, filed on Jun. 17, 2016, which claims the benefit of Japanese Application No. 2015-209593, filed on Oct. 26, 2015, the entire contents of each are hereby incorporated by reference.

TECHNICAL FIELD

The present invention relates to a composite container where a cylindrical liner made of a metal or a plastic is wrapped with resin impregnated fibers or fiber reinforced plastics (FRP) so that a fiber reinforced plastic layer (which is also referred to as an FRP layer) is formed to reinforce the strength.

BACKGROUND ART

Composite containers where the outer surface of the liner is reinforced with an FRP layer are used in various fields. In fuel cell cars for example, a composite container, where an FRP layer is formed on the outer surface of a light metal liner made of an aluminum alloy coated with an insulating paint, is used as a high pressure tank in a long, cylindrical form that is to be filled with hydrogen gas and mounted in a car.

A filament winding method is used to wind FRP around a metal liner or the like in order to form a composite container. Patent Document 1, which is described below, discloses a composite container where carbon fibers or glass fibers that are impregnated with a thermosetting resin such as an epoxy resin are used as FRP, and hoop winding FRP layers (which are referred to as hoop layers) and helical winding FRP layers (which are referred to as helical layers) are wound around a metal liner for reinforcement along the liner axis in the longitudinal direction of the metal liner in accordance with a filament winding method.

Here, hoop winding refers to a winding method according to which FRP are wound around the cylindrical section of the liner in the direction of the circumference, and concretely refers to a winding method according to which FRP are wound around the cylindrical section at a winding angle of 86 to 90 degrees relative to the direction of the axis of the liner (hereinafter, referred to as an orientation angle). The hoop winding allows adjacent FRP to make contact with each other without a gap between the FRP when being wound. Meanwhile, helical winding refers to a winding method according to which FRP are wound in a helical form passing from one of the dome sections (also referred to as mirror sections) of the liner through the cylindrical section to the other dome section at an orientation angle that is constant at an angle of 85 degrees or less. In the helical winding, a gap is created between adjacent FRP.

FIG. 8 is a diagram illustrating an example of the cross-section structure of a conventional composite container. In a long composite container as one for being mounted in a car, at least one hoop layer 2 and at least one helical layer 3 are layered on top of each other on the outer surface of the liner 1 in order to reinforce the strength of the pressure container. In the example in FIG. 8, three hoop layers 2 and three helical layers 3 are alternately layered on top of each other in order to increase the strength of the reinforcement.

Between these layers, hoop layers 2 are wound solely for the purpose of reinforcing the strength of the cylindrical section 4, whereas the helical layers 3 are wound for the main purposes of reinforcing the area around the left and right dome sections 5 and 6 and reinforcing the strength of the liner 1 in the direction of the axis.

CITATION LIST

Patent Literature

PTL 1: Japanese Unexamined Patent Publication 2010-236587

SUMMARY OF INVENTION

Technical Problem

FIG. 9 is a front diagram showing a method for winding a helical layer 3 in FIG. 8. In a helical layer 3, FRP start being wound with a point in the vicinity of the boss 7 that is formed in the dome section 5 at one end as the starting point (of the first winding) and are wound in helical form around the cylindrical section 4. Then, the FRP are wound around the boss 8 that is formed in the dome section 6 at the other end and again wound around the cylindrical section 4 in a helical form. The FRP are kept being wound towards the boss 7 in the dome section 5 until they reach a point (that becomes the starting point of the second winding) around the boss 7 that is very close to the starting point (of the first winding). Next, FRP start being wound from this starting point of the second winding and again are wound around the cylindrical section 4 in helical form. Here, the second winding FRP are wound so as to be parallel to the first winding FRP at a short distance away. The second winding FRP are wound around the boss 8 and again wound around the cylindrical section 4 in helical form towards the boss 7 in the dome section 5 until they reach a point (that becomes the starting point of the third winding) around the boss 7 that is very close to the starting point (of the second winding). After that, FRP are wound a number of times in the same manner while the starting point is shifted little by little around the boss 7. The similar helical windings are repeated until at least the starting point returns to the original starting point so that the entire surface of the liner 1 is completely covered with the wound FRP.

The thus-wound helical layers 3 form a pattern in mesh form where the FRP that cover the cylindrical section 4 are aligned at an orientation angle that is approximately constant.

Incidentally, the helical layers 3 are wound for the main purposes of reinforcing the areas around the dome section 5 and the boss 7 and reinforcing the strength of the liner 1 in the direction of the axis. However, the FRP are wound around the long, cylindrical section 4 in (diagonal) helical form, and therefore, the cylindrical section 4 is secondarily reinforced.

However, the cylindrical section 4 is sufficiently reinforced by the hoop layers 2 as shown in FIG. 8, and therefore, the hoop layers 2 and the helical layers 3 are made redundant for reinforcement. As a result, the helical layers 3 are more than desired from the point of view of reinforcement of the cylindrical section 4, and it is more efficient for the cylindrical section 4 to be reinforced with the hoop layers 2. On the contrary, the helical layers 3 increase the weight of the FRP that are wound around the cylindrical section 4, which causes problems such that the weight and the outer diameter of the container increase.

It is a general practice to layer hoop layers 2 and helical layers 3 alternately so as to form a multilayer in composite containers particularly from the point of view of safety and pressure resistance. In this case, the greater the number of helical layers 3 is, the more significant the increase in the weight of the cylindrical section 4 is, and in particular, this tendency becomes significant as the length of the cylindrical section 4 increases.

An object of the present invention is to solve the above-described problem and provide a composite container where the required number of helical layers is minimum (or zero), the dome sections are reinforced in the same manner as in the prior art, and the amount of FRP used for the cylindrical section is limited.

Solution to Problem

In order to solve the above-described problem, the present invention provides a composite container having such a structure that a number of FRP layers, where FRP are wound around the outer surface of a liner having dome sections at both ends, left and right, with a cylindrical section in between, are layered on top of each other, wherein the above-described FRP layers include a hoop layer where FRP are wound around the entirety of the cylindrical section in accordance with hoop winding and a dome section reinforcing layer where FRP are wound around a dome section and the cylindrical section at least in the vicinity of the dome section, and in the above-described dome section reinforcing layer, the FRP are wound around the dome section in helical form, and at the same time, the orientation angle of the FRP relative to the direction of the axis of the above-described liner continuously changes as the FRP around the cylindrical section move towards the center of the cylindrical section.

In the present invention, from among a number of FRP layers that are layered on top of each other around the outer surface of the liner, the number of helical layers is reduced by substituting them with dome section reinforcing layers. In the dome section reinforcing layers, FRP are wound in such a manner that the orientation angle in the cylindrical section is continuously changed, and as a result, the weight of the FRP that are wound around the portion in the vicinity of the center of the cylindrical section is reduced.

Concretely, FRP are continuously wound around the entirety of the cylindrical portion starting from the left and right dome sections, and at the same time, the orientation angle of FRP over the cylindrical section relative to the direction of the axis of the liner continuously becomes smaller towards the center of the cylindrical section so that the orientation angle becomes the smallest at the center of the cylindrical section (claim 2).

Alternatively, FRP are wound around the left and right portions of the cylindrical section that are separate with the center portion where FRP are not wound in between, and the orientation angle of FRP relative to the direction of the axis of the liner in a region over the cylindrical section around which FRP are wound continuously becomes greater towards the center of the cylindrical section so that the orientation angle becomes maximum at the point closest to the center, and the direction of the winding is reversed at this point (claim 3).

Advantageous Effects of Invention

In the present invention, the amount of FRP wound around the portion in the vicinity of the center of the cylindrical section can substantially be reduced as compared to the FRP layers that are wound in helical winding, and therefore, the dome sections can be reinforced while reducing the weight of the FRP layers. Here, the cylindrical section is separately reinforced by the FRP layers in hoop winding, and therefore, no problems with the strength of the cylindrical section arise even when the helical layers are substituted with the dome section reinforcing layers.

In the invention, it is preferable for the FRP to be tow-prepreg where fibers (such as carbon fibers) are impregnated with a resin (such as epoxy resin) in advance and before being wound. Tow-prepreg has viscosity, and therefore can be wound tightly without any slack even in the case where they are wound with the orientation angle being changed.

BRIEF DESCRIPTION OF DRAWINGS

FIG. 5 is a diagram showing an example of the distribution of the thickness of the dome section reinforcing layer 9a;

FIG. 6 is a diagram showing an example of the range of winding of the dome section reinforcing layer 9b;

FIG. 7 is a diagram showing an example of the multilayer structure of the composite container having dome section reinforcing layers;

DESCRIPTION OF EMBODIMENTS

Figure 1:
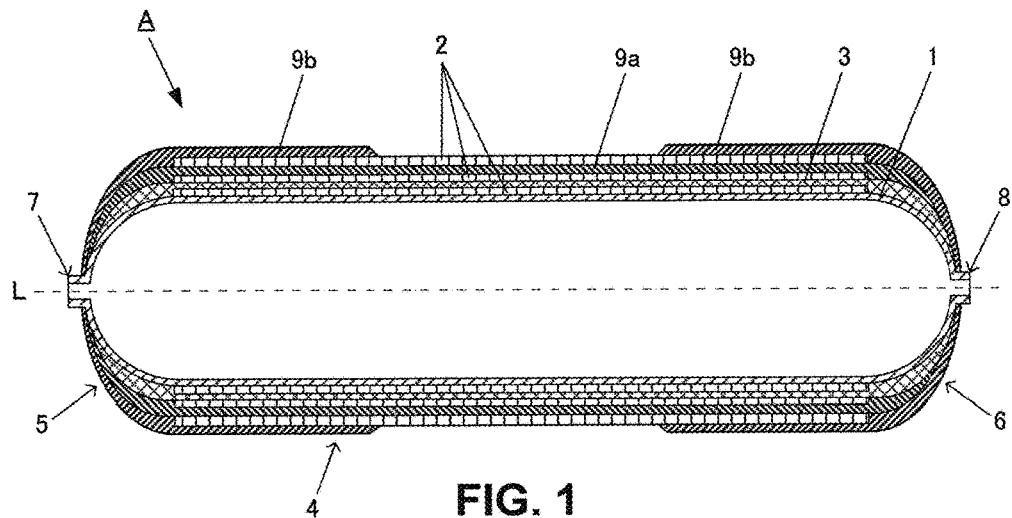
FIG. 1 is a diagram showing the cross-section of the structure of the composite container according to one embodiment of the present invention.
Figure 8:
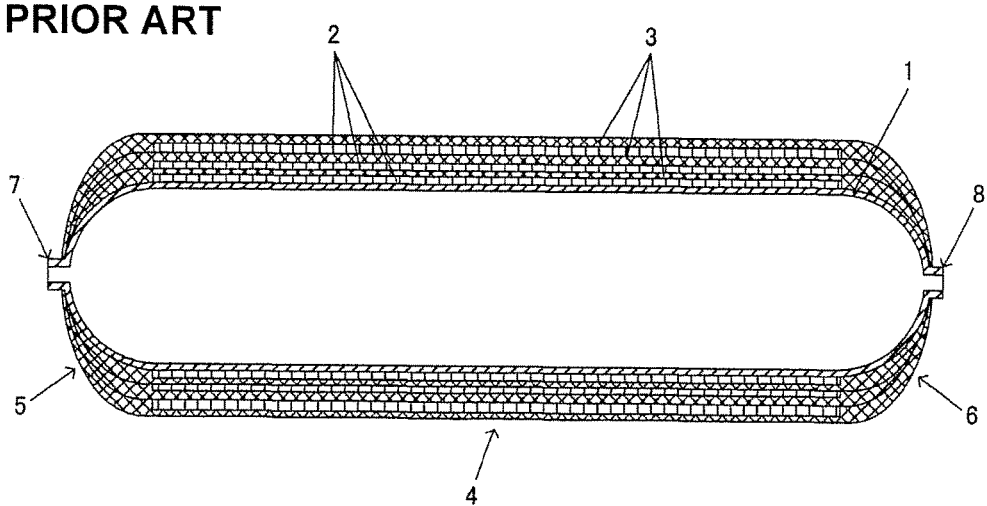
FIG. 8 is a diagram showing the cross-section of the structure of a conventional composite container.
Figure 9:
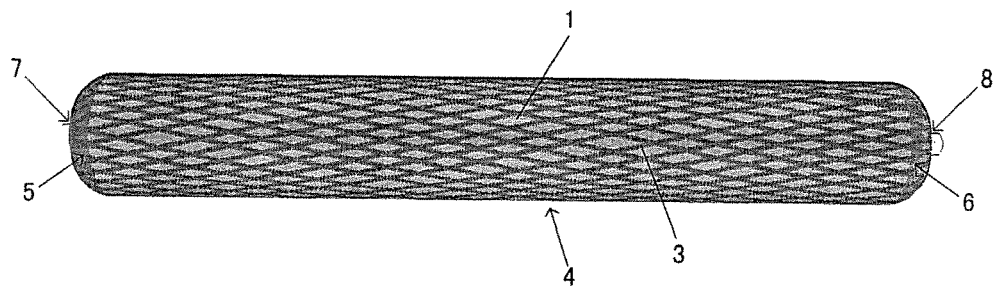
FIG. 9 is a front diagram showing a method for winding a helical layer in FIG. 8.

In the following, the structure of a composite container according to the present invention is described in reference to the drawings. FIG. 1 is a diagram showing the cross-section of the structure of the composite container according to one embodiment of the present invention. Here, the same symbols are attached to the same components as in the composite container according to the prior art in FIG. 8 so that the same descriptions can be prevented from being repeated in the following description.

In the composite container A, FRP where carbon fibers are impregnated with a thermosetting resin such as an epoxy resin are wound around the outer surface of the liner 1 made of an aluminum alloy coated with an insulating paint so that a number of FRP layers are layered on top of each other. Tow-prepreg that is impregnated with a thermosetting resin in advance and before being wound is used as the FRP. As for the FRP layers, a hoop layer 2, a helical layer 3 and a hoop layer 2 are layered on top of each other starting from the inside, and on the outside thereof, a dome section reinforcing layer 9a, a hoop layer 2 and a dome section reinforcing layer 9b are further layered on top of each other. That is to say, the helical layer 3 or the dome section reinforcing layers 9a and 9b and the hoop layers 2 are layered alternately on top of each other.

The dome section reinforcing layers 9a and 9b are layers for reinforcing the dome sections 5 and 6 that substitute conventional helical layers 3. In the present embodiment, different types of winding methods are used for the two dome section reinforcing layers 9a and 9b. First, the structure of the first dome section reinforcing layer 9a is described.

Figure 2:
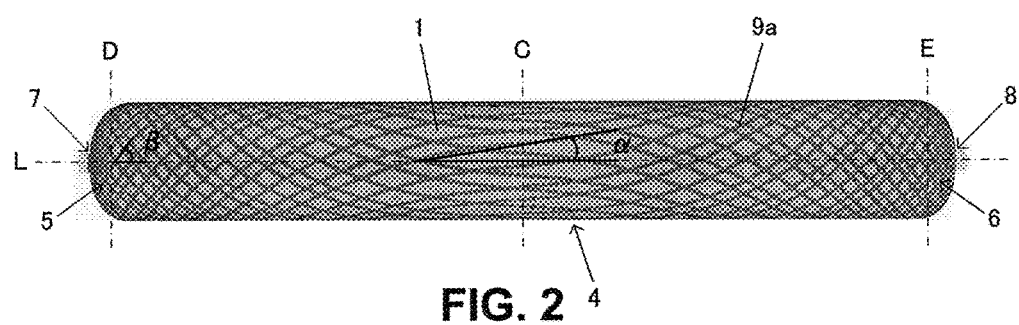
FIG. 2 is a diagram showing an example of a method for winding FRP in the dome section reinforcing layer 9a in FIG. 1.

FIG. 2 is a diagram showing an example of a method for winding FRP in the dome section reinforcing layer 9a. In the dome section reinforcing layer 9a, FRP are wound in helical form around the dome section 5 at one end with a point in the vicinity of the boss 7 that is formed in the dome section 5 being the starting point (of the first winding), and reach the cylindrical section 4. Over the cylindrical section 4, the orientation angle at which FRP are wound relative to the direction of the axis L of the liner 1 (the same direction as the geodesic line connecting the centers at both ends of the liner 1) continuously becomes smaller towards the center C of the cylindrical section. That is to say, FRP are wound to create the relationship of $\alpha<\beta$, where $\alpha$ is the orientation angle at the center C of the cylindrical section and $\beta$ is the orientation angle at the left end portion D of the cylindrical section.

The orientation angle again increases towards the right end portion E of the cylindrical section from the center C of the cylindrical section so that the orientation angle becomes $\beta$ in the right end portion E of the cylindrical portion. Next, FRP are wound around the dome section 6 in helical form and go around the portion around the boss 8 so as to again reach the cylindrical section 4. Over the cylindrical section 4, the orientation angle at which FRP are wound relative to the direction of the axis L of the liner 1 continuously becomes smaller towards the center C of the cylindrical section in the same manner as described above so that FRP are wound to create the relationship of $\alpha<\beta$, where a is the orientation angle at the center C of the cylindrical section and $\beta$ is the orientation angle at the right end portion E of the cylindrical section.

The orientation angle again increases towards the left end portion D of the cylindrical section from the center C of the cylindrical section so that the orientation angle becomes $\beta$ in the left end portion D of the cylindrical section. Next, FRP are wound around the dome section 5 in helical form and go around the portion around the boss 7 so as to reach the point (point that becomes the start point of the second winding) around the boss 7 that is slightly shifted from the (first winding) start point. Then, FRP are wound the dome section 5 in helical form with this point as the second winding start point so as to reach the cylindrical section 4. Here, the second winding FRP are wound in such a manner as to be parallel with the first winding FRP at a short distance away from the first winding FRP. After that, FRP are wound in the same manner going back and forth between the boss 7 and the boss 8, and thus, the same winding process is repeated until the start point returns to the original start point and FRP completely cover the entire outer surface of the liner 1.

By using such a winding method, the average thickness of FRP in the vicinity of the center C of the cylindrical section becomes smaller as compared to the conventional helical layers 3, and thus, the weight of FRP can be greatly reduced.

Figure 3:
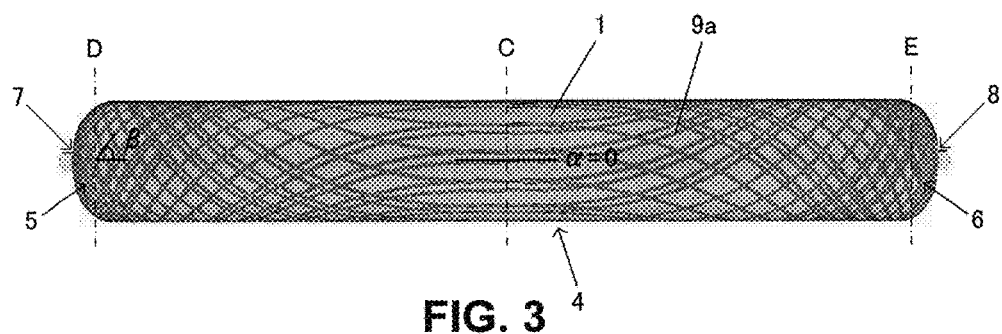
FIG. 3 is a diagram showing another example of a method for winding FRP in the dome section reinforcing layer 9a similar to FIG. 2.

FIG. 3 is a front diagram showing the dome section reinforcing layer 9a when the orientation angle $\alpha$ of FRP at the center C of the cylindrical section is 0 degrees. When the orientation angle is 0 degrees at the center C of the cylindrical section, the weight of FRP at the center C of the cylindrical section can be reduced by the greatest amount in the winding method shown in FIG. 2.

Figure 4:
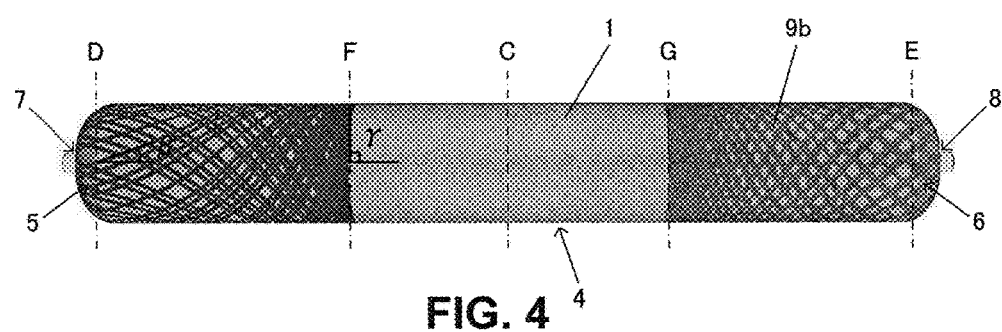
FIG. 4 is a diagram showing an example of a method for winding FRP in the dome section reinforcing layer 9b in FIG. 1.

Next, the structure of the second dome section reinforcing layer 9b is described. FIG. 4 is a diagram showing an example of a method for winding FRP in the dome section reinforcing layer 9b. The dome section reinforcing layer 9b is different from the dome section reinforcing layer 9a in that FRP are not wound around the portion in the vicinity of the center C of the cylindrical section as shown in FIG. 4, and are wound around the left and right regions over the cylindrical section 4 that are close to the dome sections 5 and 6 and are separate from each other.

That is to say, in the dome section reinforcing layer 9b, FRP are wound around the dome section 5 in helical form with a point around the boss 7 that is formed in the dome section 5 at one end being the start point (of the first winding) so as to reach the cylindrical section 4. In addition, the orientation angle at which FRP are wound over the cylindrical section 4 relative to the direction of the axis L of the liner 1 continuously becomes greater towards the center C side of the cylindrical section from the left end portion D of the cylindrical section so that the orientation angle at the reversing point F that is closest to the center becomes maximum (approximately 90 degrees), where the direction of winding is reversed and FRP are wound in such a manner that the orientation angle again becomes smaller. Accordingly, FRP are wound in such a manner that the orientation angle $\beta$ in the left end portion D of the cylindrical section and the orientation angle $\gamma$ at the reversing point F create the relationship $\beta<\gamma$.

Next, FRP are wound again around the dome section 5 in helical form starting from the left end portion D of the cylindrical section and go around a portion around the boss 7 until they reach the point (point that becomes the start point of the second winding) that is slightly shifted around the boss 7 from the start point (of the first winding). Then, FRP are wound around the dome section 5 in helical form with this point being the start point of the second winding so as to reach the cylindrical section 4. At this time, the second winding FRP are wound so as to be parallel with the first winding FRP at a short distance away from the first winding FRP. After that, FRP are wound in the same manner while going back and forth between the boss 7 and the reversing point F, and the same winding process is repeated until the start point returns to the original start point, and thus, FRP are wound until the entire outer surface of the liner 1 is completely covered between the dome section 5 and the reversing point F.

After that, FRP are wound in the same manner on the dome section 6 side, and thus, FRP are wound until the entire outer surface of the liner 1 is completely covered between the dome section 6 and the reversing point G.

By using such a winding method, the average thickness of the portion in the vicinity of the reversing point F increases (the weight of the winding increases locally). As the entirety of the cylindrical section, however, the weight of FRP in the portion in the vicinity of the center C of the cylindrical portion can be reduced by a further greater amount as compared to the helical layers 3.

(Modification)

Though the above-described embodiment provides a winding method where the dome section reinforcing layer 9a and the dome section reinforcing layer 9b intertwine, the two layers both may have the same structure as the dome section reinforcing layer 9a or the dome section reinforcing layer 9b.

Though two dome section reinforcing layers are formed in the above-described embodiment, the same effects can be gained even in the case where only one layer is formed. Conversely, the number of layers having the same structure as the dome section reinforcing layer 9a or the dome section reinforcing layer may be increased. In either case, the same reinforcement effects can be gained while reducing the weight as compared to the case where the same number of helical layers 3 are wound.

Though either end has a boss 7 or 8 in the above-described embodiment, the same winding method can be implemented by providing a dummy boss even in the case where only one end is provided with a boss.

Though one helical layer 3 is provided in the above-described embodiment, each of the three layers may be either one of the dome section reinforcing layers without providing a helical layer 3.

Though a hoop layer 2 is layered between the dome section reinforcing layer 9a and the dome section reinforcing layer 9b as well as between the dome section reinforcing layer 9b and the helical layer 3 in the above-described embodiment, they may be partially omitted. For example, the hoop layer 2 between the dome section reinforcing layer 9a and the dome section reinforcing layer 9b may be omitted because these dome section reinforcing layers have a different way of winding.

(Example)

In order to confirm the effects of weigh reduction in the composite containers where the dome section reinforcing layers 9a and 9b are adopted as in the present invention, a composite container having a multilayer structure is formed where both of the two types of dome section reinforcing layers 9a and 9b are provided.

In the dome section reinforcing layer 9a from among these two types of dome reinforcing layers, the average thickness of the FRP layer, that is to say, the weight of the FRP layer, varies depending on the orientation angle at which FRP are wound. As shown in FIG. 5, the orientation angle is adjusted in this example so that the average thickness at the center C of the cylindrical section becomes (3/8) h when the average thickness is h at the right end portion E of the cylindrical section or at the left end portion D of the cylindrical section (along the border vis-a-vis a mirror section). At this time, the orientation angle is such as to provide a stable winding state which is difficult to come loose.

Here, the below-described high angle helical layer 3a is a helical layer 3 ranging over the entirety of the cylindrical section 4 with the orientation angle remaining to be as that at the right end portion E of the cylindrical section (left end portion D of the cylindrical section), and concretely, the orientation angle in the right end portion E of the cylindrical section (left end portion D of the cylindrical section) is 70 degrees.

In the dome section reinforcing layer 9b, the weight of the wound FRP changes from the location where the orientation angle of FRP becomes maximum along the cylindrical section 4, that is to say, the location F at which the winding of FRP reverses that is closest to the center. As shown in FIG. 6, the dome section reinforcing layer 9b is formed in this example in such a manner that the winding direction reverses at the locations that are (1/10) L away from the respective left and right ends when L is the length of the range between the right end portion E of the cylindrical section and the left end portion D of the cylindrical section. Here, the orientation angle in the right end portion E of the cylindrical section and the left end portion D of the cylindrical section is 70 degrees. In addition, the range L is concretely five meters.

FIG. 7 is a diagram showing a composite container having a multilayer structure of FRP layers, which is formed in order to confirm the effects of weight reduction by providing a dome section reinforcing layer 9a as in FIG. 5 and a dome section reinforcing layer 9b as in FIG. 6.

The FRP layers in this composite container are provided in such a manner that a helical layer 3 (including a high angle helical layer 3a) that is adopted in a conventional composite container (comparison example) and a helical layer 3 (or a high angle helical layer 3a) that is a part of the FRP layers in the multilayer structure made of hoop layers 2 are substituted with a dome section reinforcing layer 9a or 9b. Here, the orientation angle in the left and right end portions D and E of the cylindrical section is 70 degrees as described above, and the orientation angle of the helical layers 3 other than the high angle helical layers 3a is 20 degrees.

Concretely, a helical layer 3, a hoop layer 2, a helical layer 3, a hoop layer 2, a dome section reinforcing layer 9a, a hoop layer 2, a dome section reinforcing layer 9a, a hoop layer 2, a helical layer 3, a hoop layer 2, a dome section reinforcing layer 9a, a hoop layer 2, a dome section reinforcing layer 9a and a dome section reinforcing layer 9b are layered on a liner 1 in this order starting from the inside.

Here, in the conventional composite container, which is an object of comparison, a helical layer 3, a hoop layer 2, a helical layer 3, a hoop layer 2, a high angle helical layer 3a, a hoop layer 2, a high angle helical layer 3a, a hoop layer 2, a helical layer 3, a hoop layer 2, a high angle helical layer 3a, a hoop layer 2, a high angle helical layer 3a and a helical layer 3 are layered on a liner 1 in this order starting from the inside.

As a result, the weight can be reduced to 397 Kg from 445 Kg, which is the weight of the conventional composite container that is the object of comparison, by substituting the four high angle helical layers 3a with the dome section reinforcing layers 9a and one helical layer 3 with the dome section reinforcing layer 9b as described above, and thus, the weight can be reduced by 10.8%.

In addition, the cylindrical section 4 can be sufficiently reinforced with a number of hoop layers 2 in the same manner as in the comparison example, and therefore, there are virtually no effects caused by the substitution of the dome section reinforcing layers 9a and 9b.

Though the present invention is described in the above, the present invention is not necessarily limited to the above-described embodiment, and appropriate modifications and alterations can of course be implemented as long as the gist of the invention is not deviated from.

INDUSTRIAL APPLICABILITY

The present invention can be applied to the manufacture of composite containers that are reinforced with FRP layers.

REFERENCE SIGNS LIST

A composite container
C center of cylindrical section
D left end portion of cylindrical section
E right end portion of cylindrical section
F location at which the direction in which winding proceeds is reversed G location at which the direction in which winding proceeds is reversed
1 liner
2 hoop layer
3 helical layer
4 cylindrical section
5 dome section (left side)
6 dome section (right side)
7 boss
8 boss
9a dome section reinforcing layer
9b dome section reinforcing layer

The invention claimed is:

1. A composite container comprising
a liner comprising:
   a first dome section at a first end of the liner
   a second dome section at a second end of the liner, the second end located opposite the first end;
   a cylindrical section extending between the first dome section and the second dome section; and
Fiber Reinforced Plastic (FRP) layers comprising:
   a hoop layer in which winding of first FRP starts from a first boundary between the cylindrical section and the first dome section and ends at a second boundary between the cylindrical section and the second dome section such that the first FRP is wound around an entirety of the cylindrical section excluding the first dome section and the second dome section, the first FRP being wound using a hoop winding method; and
   a first dome section reinforcing layer in which winding of second FRP starts from the first dome section and ends at the second dome section such that the second FRP is wound around the first dome section, the cylindrical section, and the second dome section in a helical form,
wherein, in the first dome section reinforcing layer, a winding angle of the second FRP with respect to an axis of the liner changes as the winding of the second FRP approaches from at least one of the first dome section and the second dome section toward a midpoint of the cylindrical section between the first boundary and the second boundary such that a spacing between adjacent windings of the second FRP wound in the helical form continuously changes in an axial direction of the liner as the second FRP approaches the midpoint of the cylindrical section from the at least one of the first dome section and the second dome section.

2. The composite container according to claim 1, wherein the winding angle of the second FRP with respect to the axis of the liner continuously decreases as the winding of the second FRP approaches from the at least one of the first dome section and the second dome section toward the midpoint of the cylindrical section.

3. The composite container according to claim 1, wherein the FRP layers comprising a second dome section reinforcing layer, wherein the second dome section reinforcing layer comprising:
   a first section where third FRP is wound around the first dome section and a first part of the cylindrical section, wherein the first part of the cylindrical section extends for a predetermined distance toward the midpoint of the cylindrical section from the first boundary, wherein, in the first section, a first winding angle of the third FRP with respect to the axis of the liner increases as the winding of the third FRP approaches from the first dome section toward the midpoint of the cylindrical section; and
   a second section where the third FRP is wound around the second dome section and a second part of the cylindrical section, wherein the second part of the cylindrical section extends for the predetermined distance towards the midpoint of the cylindrical from the second boundary, wherein, in the second section, a second winding angle of the third FRP with respect to the axis of the liner increases as the winding of the third FRP approaches from the second dome section toward the midpoint of the cylindrical section.

4. The composite container according to claim 1, wherein the first FRP and the second FRP are tow-prepreg.

5. The composite container according to claim 1, wherein said FRP layers include at least one helical winding layer in addition to the hoop winding layer and the first dome section reinforcing layer.

6. The composite container according to claim 2, wherein the first FRP and the second FRP are tow-prepreg.

7. The composite container according to claim 3, wherein the first FRP, the second FRP, and the third FRP are tow-prepreg.

8. The composite container according to claim 2, wherein said FRP layers include at least one helical winding layer in addition to the hoop winding layer and the first dome section reinforcing layer.

9. The composite container according to claim 3, wherein said FRP layers include at least one helical winding layer in addition to the said hoop winding layer, the first dome section reinforcing layer, and the second dome section reinforcing layer.

10. The composite container according to claim 4, wherein said FRP layers include at least one helical winding layer in addition to the hoop winding layer and the first dome section reinforcing layer.

11. The composite container according to claim 2, wherein the winding angle of the second FRP becomes a smallest winding angle at the midpoint of the cylindrical section.

12. The composite container according to claim 11, wherein the smallest winding angle of the second FRP at the midpoint of the cylindrical section is zero.

* * * * *